United States Patent [19]

Golik

[11] Patent Number: 4,927,219
[45] Date of Patent: May 22, 1990

[54] CORNER RASTER DISTORTION CORRECTION CIRCUIT

[75] Inventor: Stephen S. Golik, Knoxville, Tenn.

[73] Assignee: North American Philips Corporation, New York, N.Y.

[21] Appl. No.: 371,868

[22] Filed: Jun. 26, 1989

[51] Int. Cl.$^5$ .................... H01J 29/56; H01J 29/70
[52] U.S. Cl. ..................................... 315/371; 315/389
[58] Field of Search .................... 315/370, 371, 389

[56] References Cited

U.S. PATENT DOCUMENTS 4,827,194  5/1989  Fernsler .......................... 315/371

Primary Examiner—Thomas H. Tarcza
Assistant Examiner—Gregory C. Issing
Attorney, Agent, or Firm—Edward W. Goodman

[57] ABSTRACT

When a diode modulator is used in a television receiver for correcting pin-cushion distortion, circuitry is included in a diode modulator driver circuit, having an operational amplifier for summing various input voltages, for providing additional correction for distortions in the corners of the raster display. This additional circuitry removes any DC component in the output signal of the driver circuit, passes only that portion of the output signal exceeding a predetermined threshold level, and negatively feeds back this signal as an input to the operational amplifier.

5 Claims, 2 Drawing Sheets

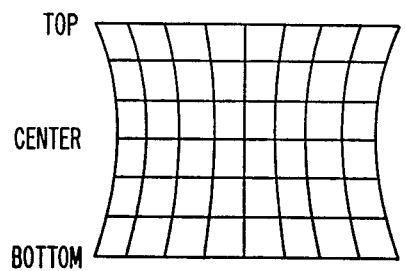
FIG. 1
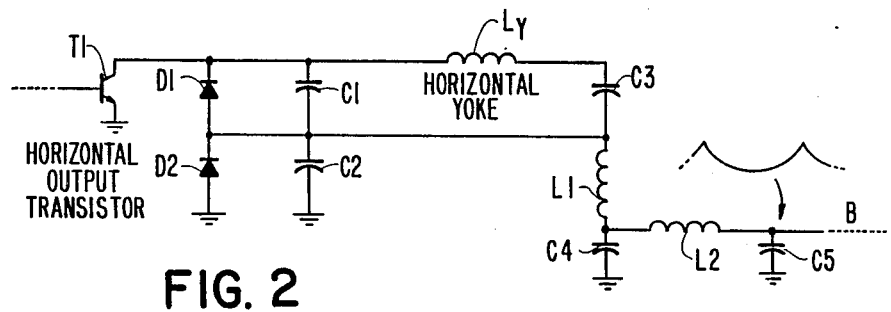
FIG. 2
FIG. 3
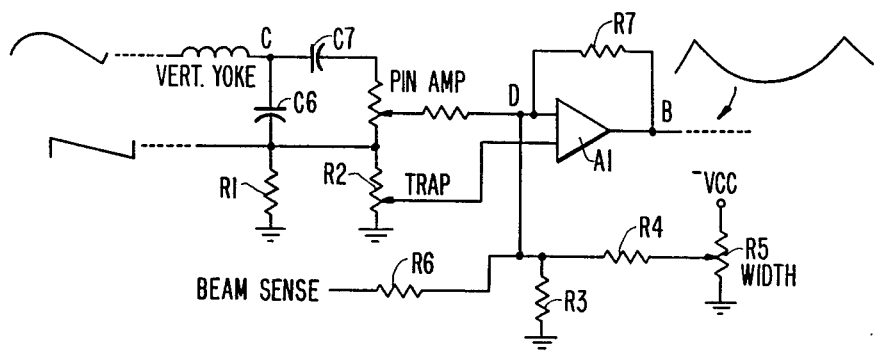

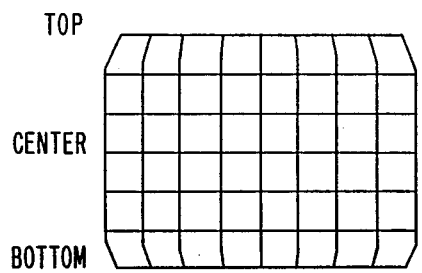
FIG. 4
FIG. 5
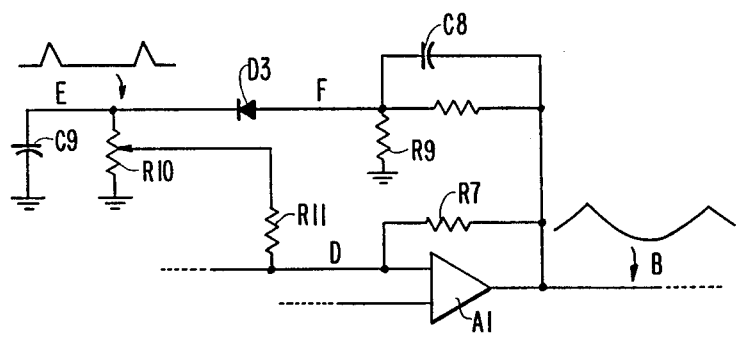
FIG. 6

CORNER RASTER DISTORTION CORRECTION CIRCUIT

BACKGROUND OF THE INVENTION

1. Field of the Invention

The subject invention relates to a circuit for the correction of horizontal distortion in a raster display of a large deflection angle cathode ray tube (CRT).

2. Description of Related Art

In television receivers, there exists a distortion in the horizontal direction known as side pincushion distortion. In smaller deflection angle CRTs, this distortion may be corrected in the deflection coils. However, for larger deflection angle CRTs, additional circuitry must be added to correct the side pincushion distortion.

The side pincushion distortion may be corrected by increasing the line deflection current at the center of the raster and/or decreasing the line deflection current at the top and bottom of the raster. A diode modulator circuit is generally used for this purpose and is described in detail in U.S. Pat. No. 4,182,978 to Boekhorst, which is hereby incorporated by reference. As shown in FIG. 2, a typical diode modulator includes a horizontal output transistor T1 which is driven by a driver circuit (not shown). The emitter of transistor T1 is grounded while the collector is connected to one end of a series arrangement of two diodes D1 and D2, one end of a series arrangement of capacitors C1 and C2 (the other ends of both series arrangements being connected to ground), and to the line deflection coil Ly. The other end of the coil Ly is connected to a capacitor C3 which, in turn, is connected to the junctions of diodes D1 and D2 and of capacitors C1 and C2, and also to a one end of a series arrangement of inductors L1 and L2, the junction thereof being connected to ground via a capacitor C4. The free end of inductor L2 is connected to ground at node B via a capacitor C5. A voltage impressed at node B modulates the line deflection current. A larger voltage at node B will cause the horizontal width to decrease more than a smaller voltage. Hence, in order to correct the raster distortion of FIG. 1, a voltage waveform having a parabolic shape and the correct polarity is impressed at node B, as shown in FIG. 2. This is available from the vertical deflection output circuit in a television receiver which is then processed by a diode modulator driver stage.

A typical diode modulator driver stage is shown in FIG. 3 and may be represented by an operational amplifier A1 operating in an input summing configuration. This particular configuration is used because, due to the nature of the output voltage required at node B, several inputs are needed. The vertical parabola is obtained from the combination of capacitor C6 and resistor R1. Due to the design of the vertical output deflection amplifier, the voltage signal at the top of capacitor C6, with respect to ground, has a vertical ramp superimposed with the parabola. By proper choice of resistor R3 and the position of the wiper on variable resistor R2, it is possible to remove the ramp component from the voltage signal at node B or to allow either a small amount of positive going or negative going ramp to appear at node B giving the voltage waveform at node B a distinctive inclination to correct for trapezoid distortion in the raster. In addition to the input parabola and ramp, there is summed into node D a DC voltage from resistors R4 and R5 which allows the DC value of the voltage waveform at node B to be varied, thus allowing the horizontal width of the raster to be varied. Dynamic width regulation is obtained by resistor R6 which senses the beam current of the ultor anode and compensates for the increase in horizontal width due to the falling ultor anode voltage with an increase in beam current.

While the circuits of FIGS. 2 and 3 adequately correct the side pincushion distortion shown in FIG. 1, applicant has noticed that in certain CRTs, the correction of the side pincushion distortion leads to a distortion of the raster in the corner regions, as shown in FIG. 4.

SUMMARY OF THE INVENTION

An object of the present invention is to correct additional distortions in the corners of the raster resulting from the correction of side pincushion distortion.

A further object of the present invention is to provide the above additional correction at a minimum of cost and without interacting with any of the other driver circuit adjustments.

The above objects are achieved in a diode modulator driver circuit of the above type having an operational amplifier for summing various input voltages and for supplying an output signal of said circuit, wherein the diode modulator driver circuit further comprises means coupled to an output of said diode modulator driver circuit for removing any DC component in the output signal thereof; threshold means coupled to said removing means for passing only that portion of said output signal exceeding a predetermined threshold level; and means for negatively feeding back an output of said threshold means to an input of said operational amplifier.

The main feature of the subject invention is that the corner adjustment effected thereby does not affect the width at the center of the raster so that the amplitude of the parabola and the horizontal scan width may be set first and then the operator may add the desired amount of corner correction without having to re-adjust either the amplitude or the width.

BRIEF DESCRIPTION OF THE DRAWINGS

With the above and additional objects and advantages in mind as will hereinafter appear, the subject invention will be described with reference to the accompanying drawings, in which:

FIG. 1 illustrates a raster display with side pincushion distortion;

FIG. 2 is a schematic diagram of a diode modulator circuit;

FIG. 3 is a schematic diagram of a diode modulator driver circuit for effecting side pincushion distortion correction;

FIG. 4 illustrates a raster display with corner distortion;

FIG. 5 is a schematic diagram of a modification to the diode modulator driver circuit of FIG. 3, embodying the subject invention; and FIG. 6 shows a waveform for correcting side pincushion distortion modified by the circuit of the subject invention to also correct for corner distortion.

DESCRIPTION OF THE PREFERRED EMBODIMENT

As shown in FIG. 5, the amplifier A1 of the diode modulator driver circuit of FIG. 3, having the feedback resistor R7 connected between the output and the inverting input thereof, further includes a voltage divider of resistors R8 and R9 connecting the output of amplifier A1 to ground, in which the resistor R8 is shunted by a capacitor C8. The junction between the resistors R8 and R9 is connected to the cathode of a diode D3. The anode of the diode D3 is connected to ground via the parallel combination of a capacitor C9 and a variable resistor R10. The wiper of the variable resistor R10 is connected to the inverting input of the amplifier A1 via a resistor R11.

The capacitor C8 and the resistor R9 AC couple the waveform at the output of the amplifier A1, while the diode D3 only conducts on positive voltage peaks of, for example, 0.6 volts or higher. This produces the signal shown at node E in FIG. 5. This signal is adjusted in resistor R10 and is applied to the inverting input of the amplifier A1 through the resistor R11, the signal thereby reducing the overall gain of the amplifier A1 at the top and bottom of the raster. The value of resistor R11 is chosen to be high so that it looks like a current source relative to the shunt impedance at node D of the amplifier A1. The purpose of resistor R8 is to inject a small amount of DC bias to node F allowing more or less correction in the extreme corners. The capacitor C9 filters and rounds off the edge of the waveform at the node E to reduce any distortion caused by the additional circuitry.

As shown in FIG. 6, the signal at node B is also in the form of a parabola. However, the peaks of the parabola have been rounded off thereby decreasing the amplitude of the signal at the corner regions of the raster.

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. A corner distortion correction circuit for correcting corner distortion in a raster display in which side pincushion correction has been effected by a diode modulator driver circuit including an operational amplifier having an output for providing an output signal of said diode modulator driver circuit, said corner distortion correction circuit comprises:

means coupled to the output of said operational amplifier for removing any DC component in the output signal thereof;

threshold means coupled to said removing means for passing only that portion of said output signal exceeding a predetermined threshold level; and negative feedback means for negatively feeding back an output of said threshold means to an input of said operational amplifier.

2. A corner distortion correction circuit as claimed in claim 1, wherein said removing means comprises a capacitor having one end connected to the output of said operational amplifier, and a resistor connecting the other end of said capacitor to ground.

3. A corner distortion correction circuit as claimed in claim 2, wherein said threshold means comprises a diode connected to an output of said removing means, wherein the forward bias voltage of said diode constitutes the threshold level of said threshold means.

4. A corner distortion correction circuit as claimed in claim 3, wherein said negative feedback means comprises a series arrangement of a variable resistor and a fixed resistor connected between said threshold means and an inverting input of said operational amplifier.

5. A corner distortion correction circuit as claimed in claim 1, wherein said circuit further comprises means for rounding edges in an output of said threshold means.

* * * * *